United States Patent
Amir et al.

(10) Patent No.: US 6,907,570 B2
(45) Date of Patent: Jun. 14, 2005

(54) VIDEO AND MULTIMEDIA BROWSING WHILE SWITCHING BETWEEN VIEWS

(75) Inventors: Arnon Amir, Saratoga, CA (US); Dulce Beatriz Ponceleon, Palo Alto, CA (US); Savitha Srinivasan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 09/822,035

(22) Filed: Mar. 29, 2001

(65) Prior Publication Data

US 2002/0140719 A1 Oct. 3, 2002

(51) Int. Cl.[7] .................................................. G09G 5/00
(52) U.S. Cl. ........................ 715/720; 715/727; 715/748; 725/59
(58) Field of Search ................................ 345/717–721, 345/727, 748, 764, 972; 725/40, 51, 52, 59–61

(56) References Cited

U.S. PATENT DOCUMENTS

| | | | |
|---|---|---|---|
| 5,267,334 A | 11/1993 | Normille et al. | |
| 5,452,435 A | 9/1995 | Malouf et al. | |
| 5,727,141 A | 3/1998 | Hoddie et al. | |
| 5,732,217 A | * 3/1998 | Emura | 725/90 |
| 5,739,862 A | 4/1998 | Cen | |
| 5,813,014 A | 9/1998 | Gustman | 707/103 |
| 5,892,915 A | 4/1999 | Duso et al. | |
| 5,929,849 A | 7/1999 | Kikinis | 345/327 |
| 5,933,603 A | 8/1999 | Vahalia et al. | |
| 5,963,215 A | 10/1999 | Rosenzweig | 345/437 |
| 6,104,706 A | 8/2000 | Richter et al. | |
| 6,137,484 A | 10/2000 | Hoddie et al. | |
| 6,166,735 A | 12/2000 | Dom et al. | |
| 6,175,840 B1 | 1/2001 | Chen et al. | |
| 6,177,922 B1 | 1/2001 | Schiefer et al. | |
| 6,181,334 B1 | 1/2001 | Freeman et al. | |
| 6,182,073 B1 | 1/2001 | Kukkal | |
| 6,185,527 B1 | 2/2001 | Petkovic et al. | |
| 6,535,639 B1 | * 3/2003 | Uchihachi et al. | 382/225 |
| 2002/0133247 A1 | * 9/2002 | Smith et al. | 700/94 |

OTHER PUBLICATIONS

60/247,381. Provisional Application to Smith et al above.*

D. Ponceleon et al., "Key to Effective Video Retrieval: Effective Cataloging and Browsing," Proceedings of the 6th ACM International Conference on Multimedia, 1998, pp. 99–107.

S. Srinivasan et al., "Engineering the Web for Multimedia," Web Engineering Workshop (WEBE) WWW–9, Amsterdam, May 15–19, 2000.

A. Amir et al., "Using Audio Time Scale Modifications for Video Browsing," Video Use in Office and Education, Thirty–Third Hawaii Intl. Conf. On System Sciences HICSS–33–2000, Maui, Jan. 2000.

(Continued)

Primary Examiner—John Cabeca
Assistant Examiner—Brian Detwiler
(74) Attorney, Agent, or Firm—Daniel E. Johnson

(57) ABSTRACT

Preferred implementations of the invention permit a user to seamlessly switch from a first media stream to a second media stream in a synchronized way, such that the second media stream picks up where the first media stream left off. In this way, the user experiences events chronologically but without interruption. In a preferred implementation, a user watching a skim video switches to a full length video when, for example, the skim video reaches a frame that is of particular interest to the user. The full length video begins at a point corresponding to the frame in the skim video that is of interest to the user, without skipping over video segments, so that the user does not experience any time gaps in the story line.

74 Claims, 11 Drawing Sheets

OTHER PUBLICATIONS

A. Amir et al., "Towards Automatic Real Time Preparation of On–Line Video Proceedings for Conference Talks and Presentations," Thirty–Fourth Hawaii Int. Conf. On System Sciences, HICSS –34–2000, Maui, Jan. 2001.

S. Srinivasan et al. "What is in that video anyway?": In Search of Better Browsing, $6^{th}$ IEEE Intl. Conference on Multimedia Computing and Systems, Jun. 7–11, 1999, Florence, Italy.

J. Foote et al. "Enhancing Distance Learning with Panoramic Video," Proceedings of the $34^{th}$ Hawaii Intl. Conf. On Systems Sciences, 2001.

* cited by examiner

| Skim View | Fast Moving SB | Slow Moving SB | Full Video |
|---|---|---|---|
| ---- | 00:00:00:00 | 00:00:00:00 | 00:00:00:00 |
| ---- | ---- | 00:00:00:01 | ---- |
| ---- | ---- | 00:00:00:02 | 00:00:00:01 |
| ---- | ---- | 00:00:00:03 | ---- |
| ---- | 00:00:00:01 | 00:00:00:04 | 00:00:00:02 |
| ---- | ... | ... | ... |
| ---- | ... | ... | ... |
| ---- | ... | ... | ... |
| ---- | ... | ... | ... |
| 00:00:00:00 | 00:00:02:15 | 00:00:10:00 | 00:00:05:00 |
| ... | ... | ... | ... |
| ... | ... | ... | ... |
| ... | ... | ... | ... |
| 00:00:05:00 | 00:00:05:00 | 00:00:20:00 | 00:00:10:00 |
| ---- | ... | ... | ... |
| ---- | ... | ... | ... |
| ---- | ... | ... | ... |
| ---- | ... | ... | ... |
| ---- | ... | ... | ... |
| 00:00:05:01 | 00:00:15:00 | 00:01:00:00 | 00:00:30:00 |
| ... | ... | ... | ... |

*FIG. 8*

| Index n | Fast Moving Storyboard |
|---:|---|
| 0 | 00:00:00:00 |
| 4 | 00:00:00:01 |
| ... | ... |
| ... | ... |
| 1,800 | 00:00:15:00 |

| Index n | Full video |
|---:|---|
| 0 | 00:00:00:00 |
| 2 | 00:00:00:01 |
| ... | ... |
| ... | ... |
| 1,800 | 00:00:30:00 |

*FIG. 9*

VIDEO AND MULTIMEDIA BROWSING WHILE SWITCHING BETWEEN VIEWS

TECHNICAL FIELD

The invention is in the field of video and multimedia browsing. More particularly, the invention relates to the ability to switch back and forth between different media streams within a browser environment.

BACKGROUND

Computers have ushered in the Information Age: With their ability to manage and process large amounts of data, the ability of the user to perform mundane tasks has been enhanced, and activities which were previously impossible are now commonplace. As computers have become more sophisticated, the tools and options at the disposal of the user have increased. For example, video browsing and, more generally, multimedia browsing are now commonly performed over the Internet or on local systems and networks such as a company's Intranet. Browsing may be conducted for any number of purposes, including entertainment, education (such as distance learning), or accessing the news.

Information in written form, such as a book, generally includes a table of contents and/or an index which permits the user to quickly evaluate the book's content and/or relevance to the user's interests. Browsing a book can be done quickly by simply flipping through the pages. Video browsing, on the other hand, while providing a number of advantages to the user, can be a very time consuming and frustrating process. Browsing a video to get an overview of its content is not generally time efficient. It may involve playing certain segments of the video and then fast forwarding or skipping to points of potential interest. This is especially time consuming in the case of an analog recording medium such as a tape, but even with digital recording media, the user must still take the time to watch various video segments.

To address these concerns, various techniques for summarizing video in a more compact form have been advanced. The use of "storyboards" is one such technique, in which a table of keyframes selected from the video are presented, possibly along with text or other "static" or stationary information. "Moving storyboards", or slide shows, are media streams which take the storyboard technique a step further by presenting a series of stationary images along with audio. "Fast playbacks", in which the video is fast forwarded, and "video summaries" ("video skim"), in which key video segments are presented, are two other video visualization technologies for more compactly presenting audiovisual information. "Talk presentation", in which video, audio, and speaker's slides play together in one or more windows, is another visualization technology. These and other possible representations of the original video are referred to herein as different "views" of the video.

U.S. Pat. No. 6,166,735 to Dom et al. ("Video story board user interface for selective downloading and displaying of desired portions of remote-stored video data objects") and the article "What is in that video anyway: in search of better browsing" (S. Srinivasan et al., 6th IEEE International Conference on Multimedia Computing and Systems, Jun. 7–11, 1999, Florence, Italy) are concerned with switching from a (static) storyboard to the corresponding video. When the user selects a keyframe in the storyboard, the video starts to play from a point in the video corresponding to the selected frame. This technology relies on the use of static links with offsets, in which the offsets do not depend on when the user selects the keyframe of interest. Furthermore, with this technology, the user cannot switch back from a point in the video to a corresponding point in the storyboard (i.e., the linking is in one direction only). This method does not allow switching from a first media stream to a second, related media stream beginning at a point in the second media stream which corresponds to the point in the first media stream where the first media stream was playing when the user made his or her selection. Thus, with this approach, the ability of the user to switch back and forth between a video and its related views is limited and not satisfactory. In particular, the user is frustrated since a compact view is not synchronized with its corresponding full length video or with other views. Thus, by way of example, switching from a point in a video summary to the corresponding point in the full video is currently not supported. What is needed is a system that provides a way of directly switching between different views, or more generally between different media streams, such that the point at which a media stream is entered corresponds to the point at which the previous media stream is exited.

SUMMARY OF THE INVENTION

Preferred implementations of the invention permit a user to seamlessly switch from a first media stream to a second media stream in a synchronized way, such that the second media stream picks up where the first media stream left off. In this way, the user experiences events chronologically without interruption. In a preferred implementation, a user watching a skim video (a compact, edited version of a video which is shorter in length than the full video and conveys a summary of the full video) switches to a full length video when, for example, the skim video reaches a frame that is of particular interest to the user. The full length video begins at or near a point corresponding to the frame in the skim video that is of interest to the user, so that the user does not experience any time gaps in the story line. An advantage of preferred implementations described herein is that the user decides which media streams to select.

One implementation is a method of browsing, which includes accessing a first media stream and allowing the first media stream to play up to some point in the first media stream. The method further includes switching media streams by selecting a second media stream different from the first media stream, which thereby starts the second media stream at a point corresponding to said point in the first media stream. In a preferred implementation, the second media stream has media content in common with the first media stream. One of the media streams may be selected from the group consisting of skim video, moving storyboard, full video, audio, text, animation, and graphics. In one preferred implementation, the point in the second media stream is selected from one of a plurality of points in the second media stream corresponding to the first media stream.

In yet another preferred implementation, the point in the second media stream corresponds in the chronological sense to said point in the first media stream. The first media stream may include a skim video, and the second media stream may include a full video. The starting point in the second media stream may advantageously compensate for user response time and thus not be precisely synchronized with the point in the first media stream. Alternatively, the starting point in the second media stream may advantageously correspond to the beginning of a shot, a video scene, or a sentence (e.g., a spoken sentence or a sentence appearing as part of closed caption text).

Another implementation is a method of providing media streams to a browser user, which includes providing a first media stream and receiving a request from the user to access a second media stream different from the first media stream, in which the request is generated at some point in the first media stream. The method further includes providing, as a result of the request, the second media stream from a point corresponding to said point in the first media stream. In a preferred implementation of the method, the second media stream has media content in common with the first media stream. In another preferred implementation, said point in the second media stream corresponds in the chronological sense to said point in the first media stream. The starting point in the second media stream may advantageously compensate for user response time and thus not be precisely synchronized with said point in the first media stream. Alternatively, said starting point in the second media stream may advantageously correspond to the beginning of a shot, a video scene, or the beginning of a sentence (e.g., a spoken sentence or a sentence appearing as part of closed caption text). In one implementation, said point in the second media stream is selected from one of a plurality of points in the second media stream corresponding to the first media stream.

In other implementations, there are provided computer program products for carrying out any of the methods herein.

Implementations of the invention are disclosed herein in which the user's experience is enhanced by enabling him or her to switch between different media streams in a synchronized or nearly synchronized fashion to reduce the time spent searching for particular video segments of interest. These implementations provide the user with video browsing techniques which are more powerful but also more flexible than those in the prior art.

In a preferred implementation, REALMEDIA is used for the streaming, whereas RealPlayer® is used as the plug-in player for streaming video and is embedded in a web browser such as Netscape Navigator® or e-Microsoft Internet Explorer®. The program logic is implemented in JavaScript® code embedded in an HTML page sent from the HTTP server to the client. The browser may advantageously be used as the front end for the IBM CueVideo content-based video and audio retrieval system. This implementation is particularly well suited to on-line browsing of videotaped conferences, allowing users to search, retrieve, and browse particular video segments of interest from a large collection of video clips.

BRIEF DESCRIPTION OF THE DRAWINGS

FIGS. 4, 5, and 6, which includes

FIGS. 8 and 9 are look-up tables which facilitate synchronous switching from one media stream to another media stream.

DETAILED DESCRIPTION OF THE INVENTION

Figure 1:
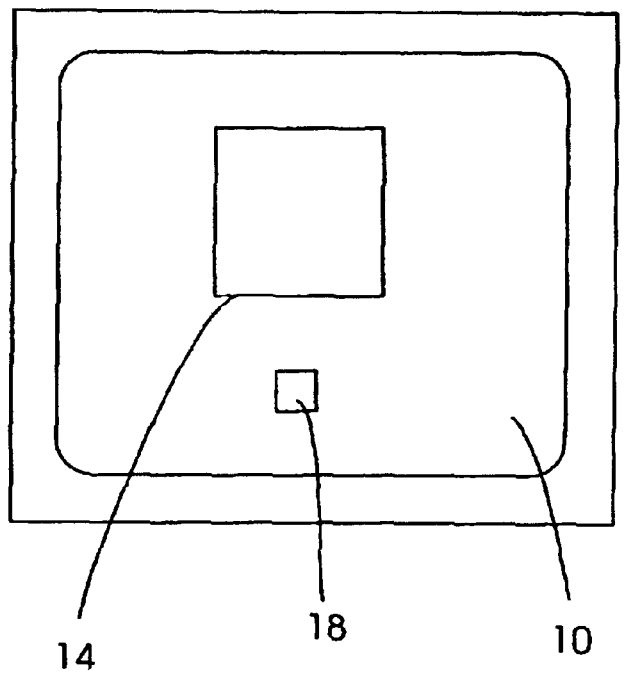
FIG. 1 shows a computer monitor screen and a viewing panel or window for watching videos, illustrating one implementation of the invention.

Preferred implementations of the invention provide the user with the ability to seamlessly switch, without loss of context, between different media streams related to each other (e.g., they may have media content in common with each other, or they may correspond to each other in the chronological sense), but which may have different media tracks, media types, or time scales. A preferred implementation provides a user the ability to switch back and forth in a synchronized way between one media stream (e.g., a skim video) to a second media stream (e.g., the full or complete video). Other kinds of media streams to be used in other implementations include but are not limited to audio, sped-up audio in combination with video (such as that described in "Using audio time scale modification for video browsing", A. Amir et al., Thirty-third Hawaii International Conference on System Sciences, HICSS-33, Maui, January 2000), skim video, and closed caption text. Switching between media streams directed to different senses (e.g., between an audio stream and a video stream) is also contemplated. The synchronization between media streams may be implemented and coordinated either at the server end or the client end. The switching between streams is preferably based on simple user input, such as the click of a mouse or depressing a key on a keyboard, thereby permitting the user to focus on the results generated by the switching of media streams, rather than on the mechanics of switching process.

For example, the user can watch a skim video or a moving storyboard, and then select the complete video stream when the user sees a particular frame of interest. The selected video then begins at (or near) that point in the video corresponding to the frame of interest. This saves the user the trouble of having to either manually locate that portion of the video of interest or watch the entire video. The user may switch from one media stream to another and back again by clicking a mouse button or a keyboard key. These and other implementations are particularly well suited for integration into the IBM Cue Video technology, as described in U.S. Pat. No. 6,166,735 to Dom et al. entitled "Video story board user interface for selective downloading and displaying of desired portions of remote-stored video data objects"; U.S. Pat. No. 6,185,527 to Petkovic et al. entitled "System and method for automatic audio content analysis for word spotting, indexing, classification and retrieval"; U.S. application Ser. No. 09/572136 to Amir et al. entitled "Fast video playback with automatic content-based variable speed" filed May 16, 2000; U.S. application Ser. No. 09/028754 to Dom et al. entitled "Method and system for automatic computation of a video storyboard" filed Feb. 24, 1998; U.S. application Ser. No. 09/295076 to Amir et al. entitled "System and method for linking an audio stream with accompanying text material" filed Apr. 20, 1999; and "Towards automatic real time preparation of on-line video proceedings for conference talks and presentations" by A. Amir et al. (Proceedings of the 34th Hawaii International Conference on System Sciences, HICSS-34, Maui, January 2001), all of which are hereby incorporated by reference.

By way of example, and with respect to FIG. 1, a video monitor screen 10 is shown on which a window 14 is displayed. Other windows and information may be displayed on the monitor screen 10 as well, as discussed below in connection with FIG. 3. The window 14 might display a first, compact media stream such as a skim video. Alternatively, another compact media stream such as a fast playback or a moving storyboard may be displayed. The user switches to a second media stream at some point, in which the first media stream and the second media stream have media content in common with each other. The second media stream could be the full length (i.e., original, unedited) video, for example.

The user begins by observing the video skim, thereby quickly obtaining an overview of the corresponding full length video. If a particular frame or scene within the video skim is of interest to the user, the user may then click on a button or on a mouse (not shown) to start the second media stream, i.e., the full length video. In particular, the user may place a cursor controlled by the mouse on a tab 18 and click when the first media stream (displayed within the window 14) reaches a point that the user wishes to observe in more detail. The full length video then begins at (or near) a point in the video determined by that point in the video skim when the user registered his or her preference to stop the video skim and switch to the full length video. For example, if the user observes in the video skim that a professor is moving to a podium to deliver a lecture, and the user desires to watch the lecture in full video mode, the user can click on the mouse, so that the full length video begins with the professor moving to the podium. In this manner, switching from the first media stream (the video skim) to the second media stream (the full length video) is synchronized, sparing the user the inconvenience of having to watch those portions of the full length video that are not of interest.

Figure 2:
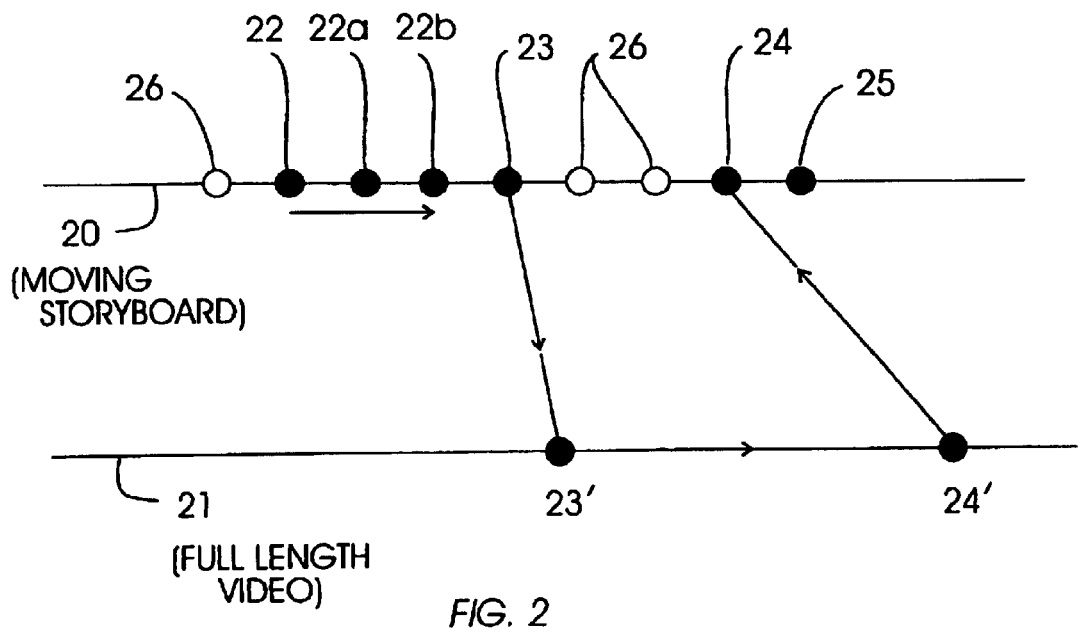
FIG. 2 illustrates timelines showing how a preferred implementation may be used in practice.

This process is illustrated by the example shown in FIG. 2. Time lines 20 and 21 correspond to a first media stream and a second media stream, respectively, which, without loss of generality, may be a video skim and its corresponding full length video. The video skim is ideally a condensed version of the full length video in which the frames are chosen to include key events within the full length video. A user accesses the video skim at a frame corresponding to point 22 and continues to view frames (e.g., at points 22a, 22b) until some later frame corresponding to point 23. Point 22 may correspond to the start of a soccer game, for example, and point 23 may correspond to the scoring of the first goal. At point 23, the user selects the full length video corresponding to the time line 21. The user's viewing window (e.g., the window 14 in FIG. 1) is then switched to the frame in the full length video showing the scoring of the first goal. This frame in the full length video is denoted by the point 23' along the full video's time line 21. The user then watches the full length video up to a frame denoted by the point 24' (e.g., the scoring of the second goal), at which point the user switches back into the skim video representation at a frame denoted by the point 24. The user may then observe additional frames, such as the one denoted by the point 25. (Frames which were not accessed by the user in this example are denoted by the open circles 26.)

The pair of points 24 and 24' thus represent the same point in the chronological sense (in this example, the scoring of the second goal), just as do the pair of points 23 and 23' (in this example, the scoring of the first goal). However, it may be advantageous to introduce some small differences in chronological time when switching from one media stream to another media stream: it may be desirable, for example, that when the user selects the full length video as the skim video reaches the scoring of the first goal, that the user is brought to a frame corresponding to a point in time a few seconds before the scoring of the first goal (e.g., less than about 2, 3 or 4 seconds), to compensate for user response time and to allow for an appropriate lead-in. (Alternatively, the starting frame may default to the beginning of the shot containing the corresponding point in time of interest.) This starting point technique is useful when moving from a long media stream to a shorter media stream, so that the starting point in the shorter media stream may be set to the beginning of the last event included in the video skim—the starting frame in the second media stream is nevertheless determined by (and corresponds in the chronological sense with) the exit frame in the first media stream, even though there is not exact synchronization in this case. Likewise, if the full length video reaches the frame corresponding to the point 24' (the scoring of the second goal) and the user selects the skim video representation a short time (e.g., a few seconds) after the second goal is scored, it may be advantageous to bring the user to the frame showing the scoring of the second goal. Additionally, in preferred implementations, the user may adjust the player position along the media stream time line manually at will (e.g., after being switched to a different media stream), to fine tune his or her position within the selected media stream. This is discussed below in connection with the time scroll tab of FIG. 3.

Figure 3:
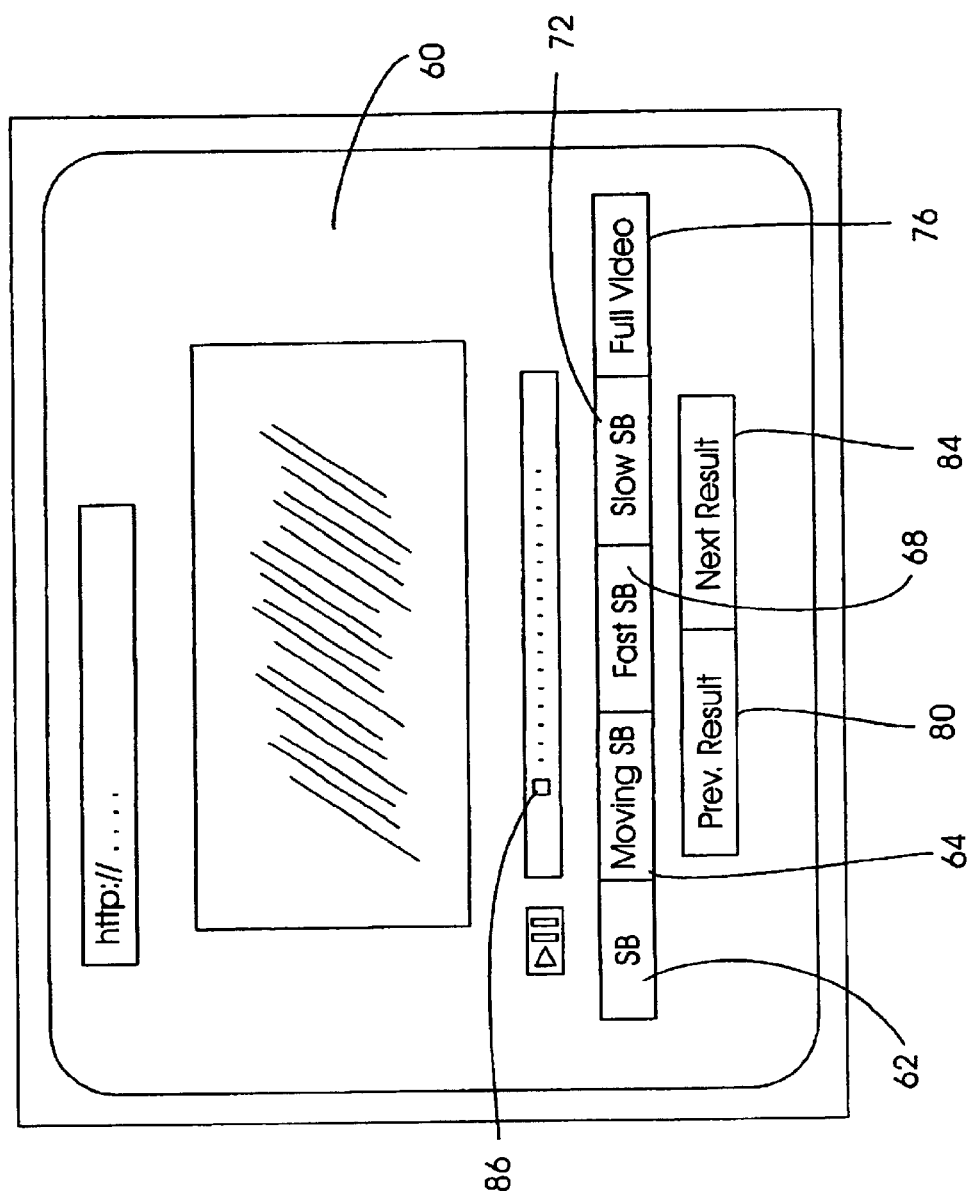
FIG. 3 shows a graphical user interface (GUI) on the screen of a monitor for watching videos, illustrating a preferred implementation of the invention.

Although implementations have been described above with respect to skim video as a first media stream and a full length video as a second media stream, other implementations present the user the option of accessing several different media streams having media content in common with each other (e.g., the different media streams correspond to several different views). In addition, with other implementations, the user begins by first accessing a database of many different media clips which do not necessarily have media content in common with each other (e.g., the media clips may be altogether different video segments) and then selecting one of them. One such implementation is described with reference to FIG. 3, in which tabs are displayed on a video monitor screen 60 for a (non-moving) storyboard 62 as well as the following media streams: moving storyboard 64, fast moving storyboard 68, slow moving storyboard 72, and full (length) video 76. In the implementation shown in FIG. 3, the user begins by searching a database of topics, e.g., by entering key words into a search engine (not shown in FIG. 3). Once the search engine identifies media clips of interest, the user selects one of them, resulting in the selected media clip starting to play at a point related to the user's search criteria. This media clip is then displayed within a viewing window 78 on the video monitor screen 60, as shown in FIG. 3. The view of the media clip that is displayed can be the full video, or a particular view (e.g., skim video) that has been preselected by the user as the default view. The user then selects one of the tabs displayed on the screen 60, e.g., the moving storyboard tab 64. At any point during the playback of the moving storyboard presentation, the user may switch from this media stream to another media stream by selecting one of the tabs 68, 72, or 76. By switching back and forth between these tabs, the user selects the rate at which he or she receives data, but does not access an unrelated media clip. The user may also fine tune his or her position within a selected media stream by moving a time scroll tab 86.

Additionally, the user may select a different media clip by selecting one of the result tabs: Previous Result 80 or Next Result 84. Selecting one of the result tabs brings the user to a point in another media clip found by the search engine, and this other media clip may or may not have media content in common with the currently running media stream.

In addition to the video representations discussed above, implementations may include other video representations such as full video at various speeds (such as fast playback or slow motion), a full video at a fixed or variable speed determined by the user, a reverse playback (e.g., fast reverse using the Apple QUICKTIME PLAYER, as described in U.S. Pat. No. 5,267,334 to Normille et al. entitled "Encoding/decoding moving images with forward and backward keyframes for forward and reverse display" and U.S. Pat. No. 5,739,862 to Cen entitled "Reverse playback of MPEG video"), a low bandwidth (e.g., 50 kbps) representation of the original, a panoramic video (see, for example, "Enhancing distance learning with panoramic video", by J. Foote and D. Kimber, Proceedings of the 34th Hawaii International Conference on System Sciences-2001), a video preview, and a video trailer. "Mosaic" video composed of multiple video tracks can be employed in which either moving storyboards or other kinds of video are employed. In the case of mosaic video, some views may be dedicated to a global view (e.g., an entire soccer field), whereas other views may focus in on areas of particular interest (e.g., an individual player on that field). Other media streams may include animation (such as fast moving storyboard without audio) and graphic display (e.g., 3-D graphics). In general, a media stream may be composed of one or more tracks playing in parallel in a synchronous way as a multi-track media stream (as described in, for example, U.S. Pat. No. 5,452,435 to Malouf et al. entitled "Synchronized clocks and media players").

Still other implementations may include media streams other than video. For example, an audio track which corresponds to the full video may be offered to the user as one of the tab options on the video monitor screen 60. The audio may be streamed out at anywhere from normal speed to up to, say, 2, 5 or even 10 times normal speed. An audio track in a language other than the language originally recorded may be used; e.g., a speaker may have his or her words translated into other languages, with the translated words being placed on a separate audio track. This permits the user to switch from an audio stream to a video stream, or vice versa. Alternatively, a dubbed sound track with video may be offered as an option. In the case of a video being played faster than normal, the audio component can be a sped-up audio or a summary of what was said, with the summary being presented at a normal or fast spoken rate and with the length of the spoken summary corresponding to the length of the video summary.

Other implementations may include text as a media stream, e.g., closed caption text. Closed caption text may include the original language or the original words translated into any language. If closed caption text is used in a fast forward mode, a larger font for key words or phrases can be used so that the user can appreciate the most important topics at a glance. In the case of a technical talk, one media stream can include a high quality image of any slides being presented. In the case of a lecture, the streaming text could be a transcript of what is being said or parts thereof, a list of the topics or phrases, or a table of contents related to the talk. Other implementations may include hyperlinks which are embedded in certain media streams, e.g., as "hotlinks" in a video stream (see, for example, U.S. Pat. No. 6,175,840 to Chen et al. entitled "Method for indicating the location of video hot links" and U.S. Pat. No. 6,137,484 to Hoddie et al. entitled "Method and apparatus for identifying user-selectable regions within multiple display frames") so that the user can be directed to various web pages of potential interest. Other implementations may have a window tied to a media stream which provides sign language.

Figure 4:
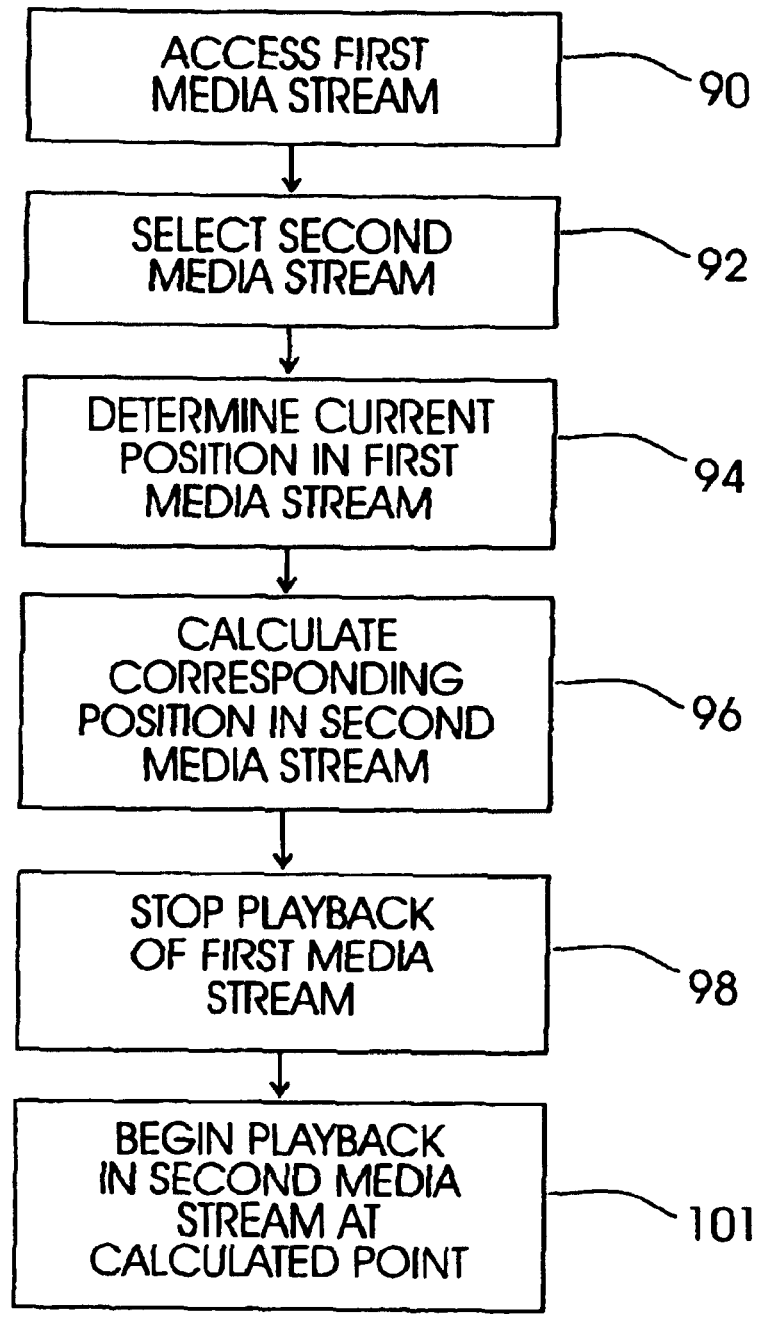

Flow charts are now presented which describe the logic used in algorithms for implementations like that shown in FIG. 3. FIG. 4 outlines logic for switching from a point in a first media stream to a point in a second media stream corresponding to the point in the first media stream where the first media stream was exited. A first media stream is accessed by the user in step 90, and the user observes this first media stream. At some point in the first media stream denoted by step 92, the user decides to switch to a second media stream having media content in common with the selected media clip, such as those represented by the tabs 64 (moving storyboard), 68 (fast moving storyboard), 72 (slow moving storyboard), and 76 (full video). This point in the first media stream corresponds to point 23 in the example shown in FIG. 2 above. The current position in the first media stream is determined (step 94), the corresponding position in the second stream is calculated (step 96), and the playback in the current view is stopped (step 98). The playback is then started at the calculated point in the second media stream (step 101). This calculated point in the second media stream corresponds to point 23' in FIG. 2 in the example above. (Alternatively, the playback in the current view may be stopped (step 98) before the starting position in the new view is determined (step 96). As a further alternative, the first media stream may continue to play until after the second media stream has started (step 101), or the actual switching can be done using standard video editing transition effects, such as a fade or a dissolve.) In a like manner, other views may be accessed by the user by repeating the algorithm.

Figure 5:
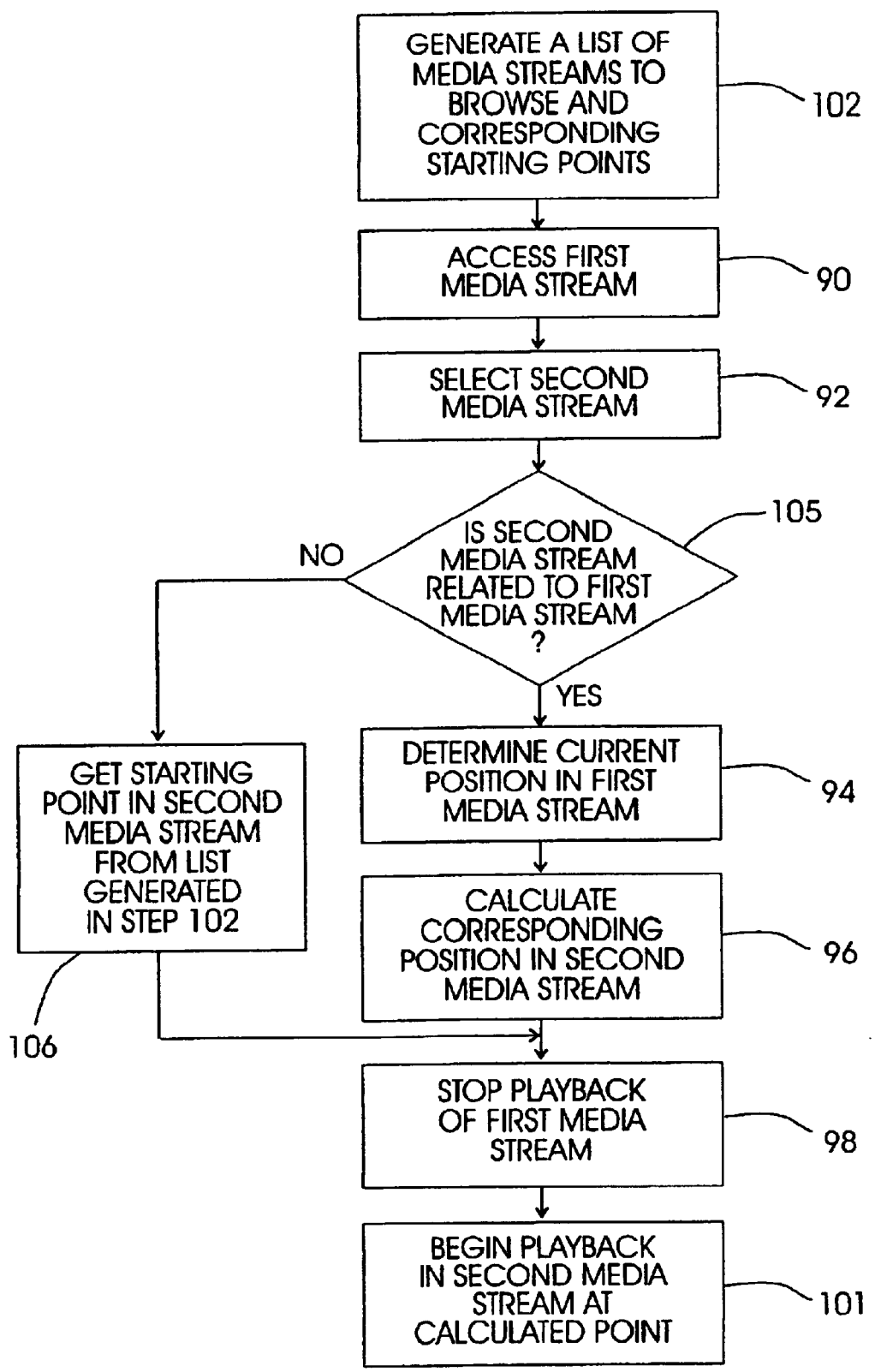

FIG. 5 outlines logic which builds on the logic illustrated in FIG. 4, by considering a preliminary step of generating a list of media clips to browse, in which the media clips do not necessarily have media content in common with each other. In this implementation the list is generated from a search as discussed above in connection with FIG. 3. (Alternatively, the user may simply select a media clip from a list of media clips, for example.) Thus, the user may advantageously switch between different views related to a single result from the search, or switch from one search result to another search result, and the system ideally differentiates between these situations. As a result of the search, a list is generated (step 102), which preferably includes an index of media clips as well as one (or more) preferred starting points within each of the media clips. These starting points ideally correspond to points within the media clips which relate most closely to the user's topic of interest. Thus, the search results may be thought of as a table of paired parameters: the media clips found by the search and respective starting points (offsets) within each of those media clips. The user accesses a first media stream (step 90), such that the corresponding full video (or alternatively a related view (e.g., skim video), which may have been preselected by the user as the default view) is displayed. At some later point, the user selects a second media stream (step 92), e.g., by clicking on a button in a graphical user interface (GUI). If the user selects a different view, such as a Fast Moving Storyboard, the decision in step 105 is YES, and the algorithm proceeds to determine the current position in the first media stream as described in connection with FIG. 4.

If, however, the user has elected to switch to another search result (e.g., by pressing the Next Result tab 84 shown in FIG. 3), then the decision in step 105 is NO. In step 106, the algorithm retrieves the starting position in the media stream corresponding to this other search result by using the list generated in step 102. In this case, there is no need to determine the current position in the first media stream, since the first media stream and the second media stream do not necessarily have media content in common with each other. The user may subsequently select other media streams to view, thereby repeating the algorithm or a portion of it.

In certain implementations, there may be more than one point in the second media stream corresponding to the point in the first media stream at which the second media stream is selected. In this case the second media stream and the first media stream may have media content in common with each other, but the points in the second media stream may not necessarily correspond in the chronological sense with the point in the first media stream. For example, the first media stream could be a video summary of one particular news story, and the second media stream could be the last 24 hours of broadcast news on a cable TV station. The story and updated versions of it could have been broadcast at several different times during this 24 hour period. In this case, the user may wish to see some or all of the different versions of the story which were broadcast; each of these versions has a corresponding starting point in the second media stream. A list of all these starting points can be kept as a table and can be accessed in various ways. In one implementation, the second media stream starts to play at a point corresponding to the first broadcast of the story, and the user can press a button "Next Result" to skip to the next broadcast of the story. In another implementation, a list of several or all of the points corresponding to the various broadcasts of the story can be displayed, and the user selects which one of these broadcasts he or she would like to play. In yet another implementation, a play-list, composed of several or all of the video segments related to the story of interest is played. In this case, the user watches all these segments as if they were combined together into one continuous video.

Figure 6A:
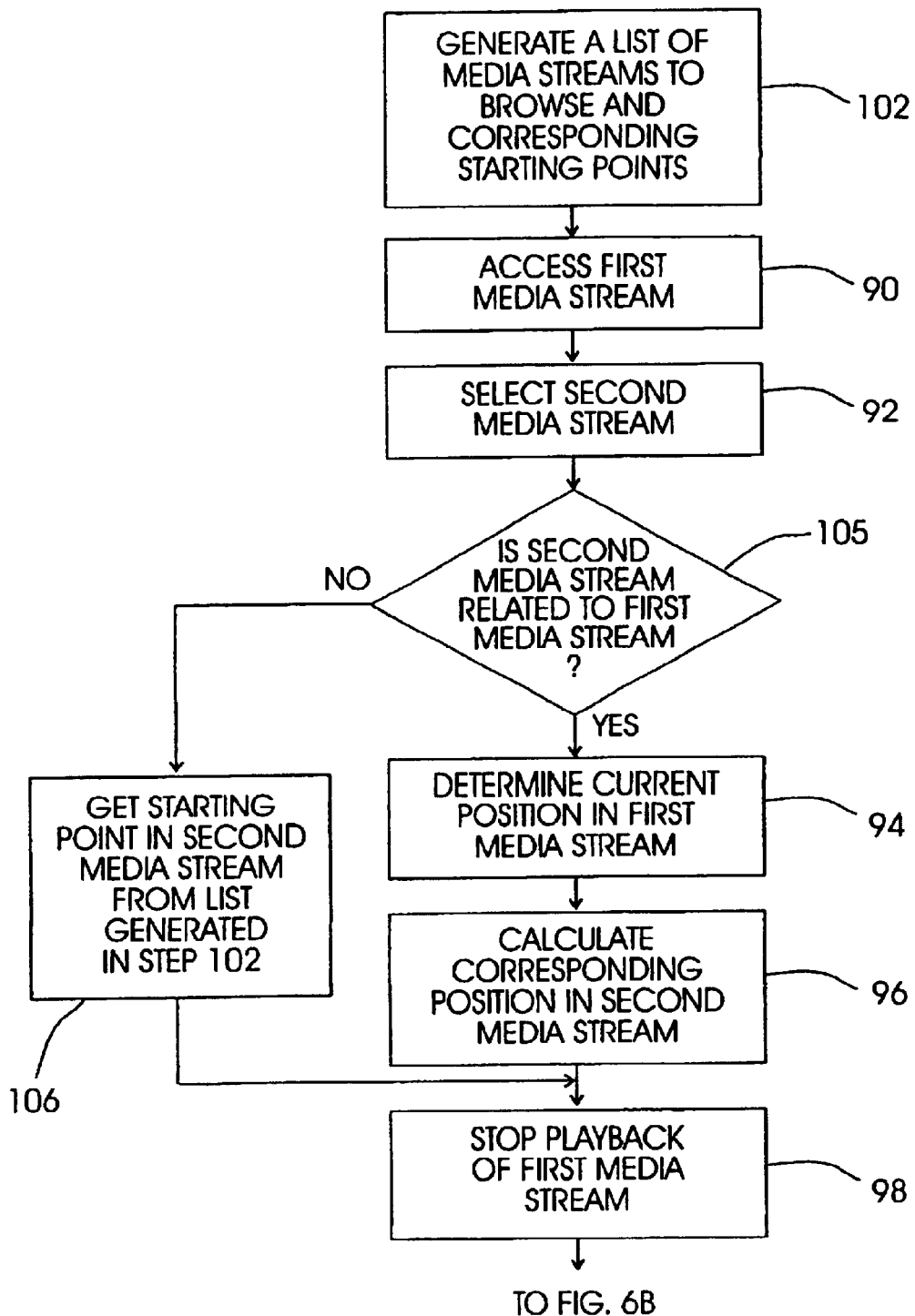
FIGS. 6A and 6B, are schematic diagrams illustrating the logic used in certain implementations of the invention.
Figure 6B:
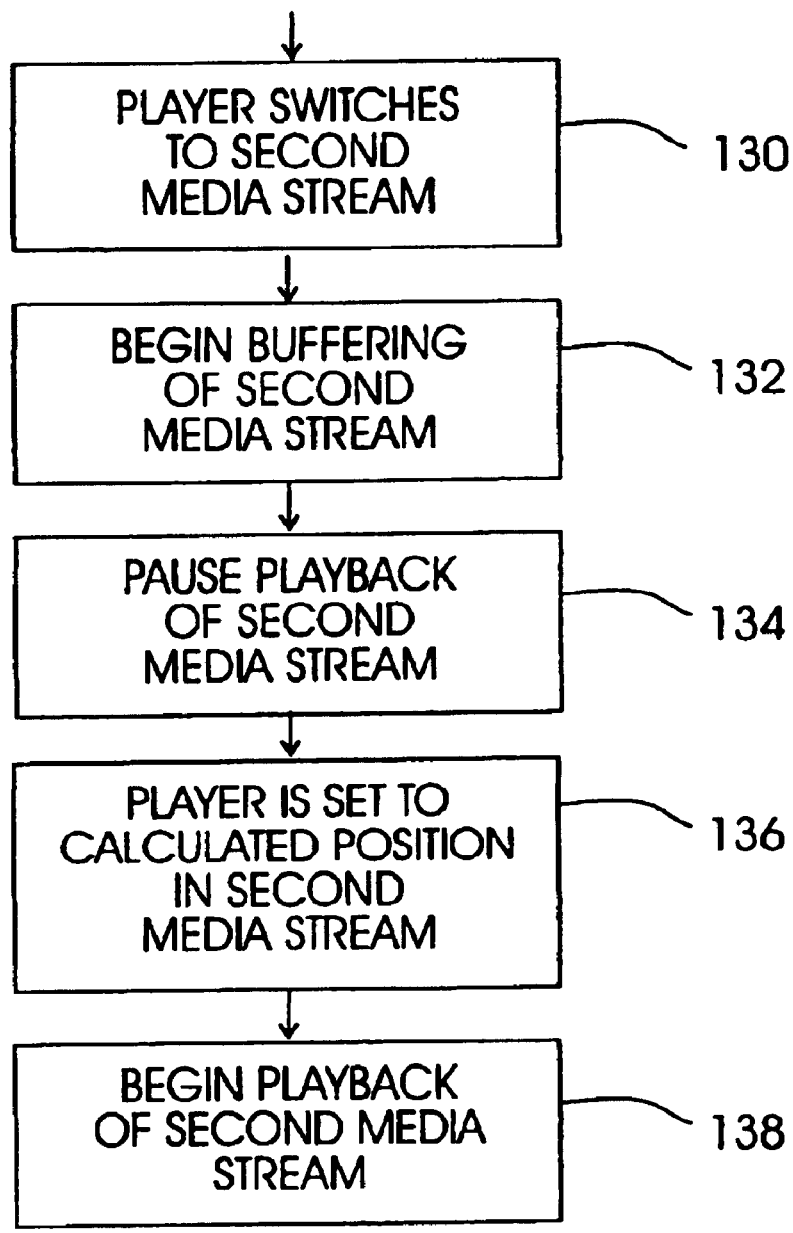

FIG. 6 is directed to an implementation related to the IBM CueVideo Toolkit, in which an application makes use of SMIL files with Real Player®. The switching from the first media stream to the second media stream in this case involves additional steps. Because of a limitation in the current Real Player® Application Program Interface (API), the position in the second media stream, when it is a stream composed using a SMIL file, cannot be set before the second media stream has already started to play. After the first media stream has been stopped (step 98), the Real Player® is set to the second media stream (step 130). In step 132, the Real Player® waits for the second media stream to fill the buffer in the Real Player® and starts to play the second media stream from its beginning. The Real Real Player® then pauses the playback (step 134), sets the Real Player® position in the second media stream to the calculated position (step 136), in which the calculated position has been calculated in step 96. The Real Player® then begins playing the second media stream at this calculated position (step 138). The logic inherent in FIG. 6 is otherwise similar to that described above in connection with FIGS. 4 and 5. The user may subsequently select other media streams to view, and the algorithm or a portion of it may be repeated.

The Appendix is a section of computer code showing JavaScript® functions for synchronous playback which may be used in a preferred implementation. In particular, the Appendix gives JavaScript® code, embedded in a DHTML page, which uses the API of the Real Player® to implement the functionality described in connection with FIG. 6. These JavaScript® functions, which are designed for the client side, provide synchronous playback based on asynchronous streaming video APIs. The different media views (such as those shown in FIG. 3) are stored as files on the video server 198, whereas, in this implementation, the browser is implemented as an HTML page that contains JavaScript® code and an embedded RealPlayer® object. Although a preferred implementation has been described with respect to RealPlayer®, other implementations involve the use of players other than RealPlayer® and may be used with a variety of video, audio and media players.

Figure 7:
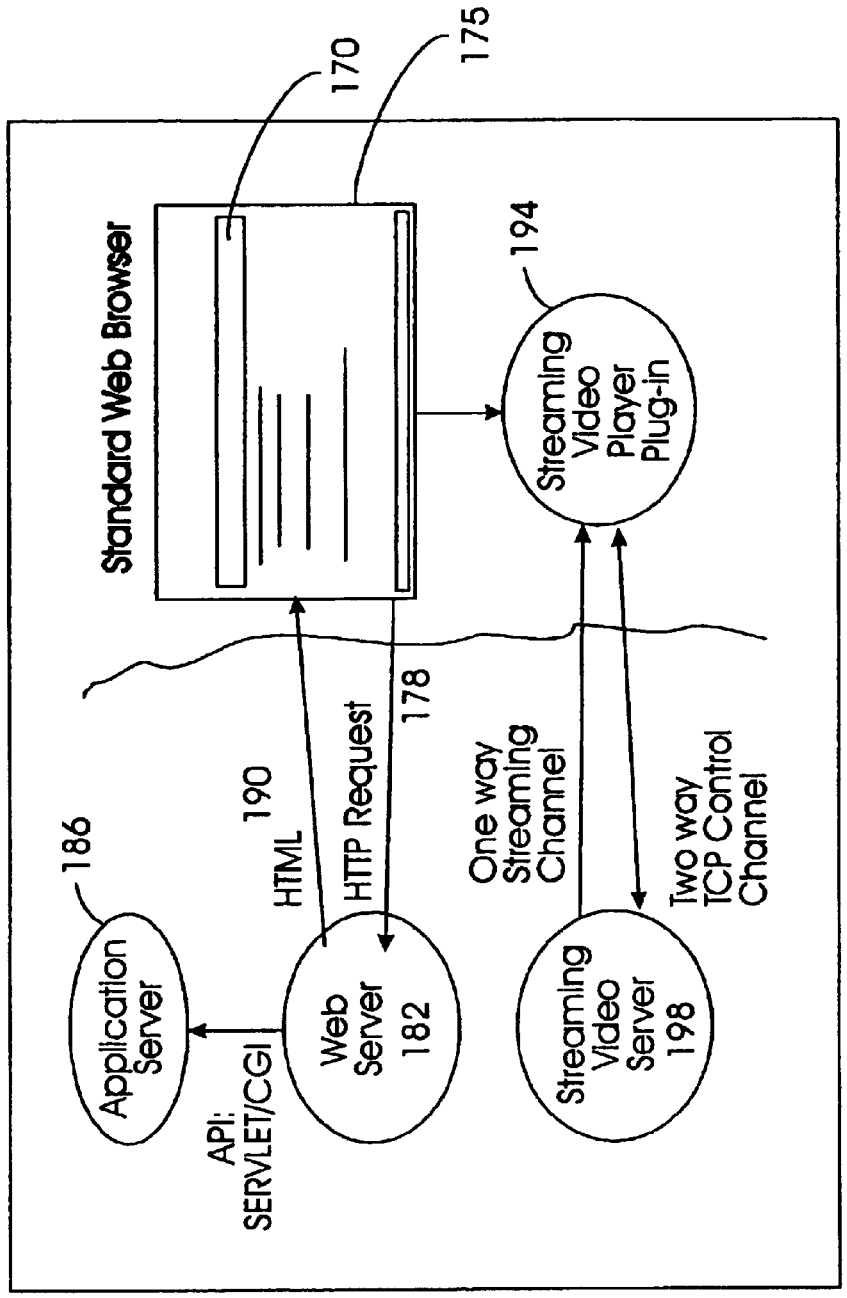
FIG. 7 is a schematic diagram of an architecture for supporting preferred implementations.
Figure 10:
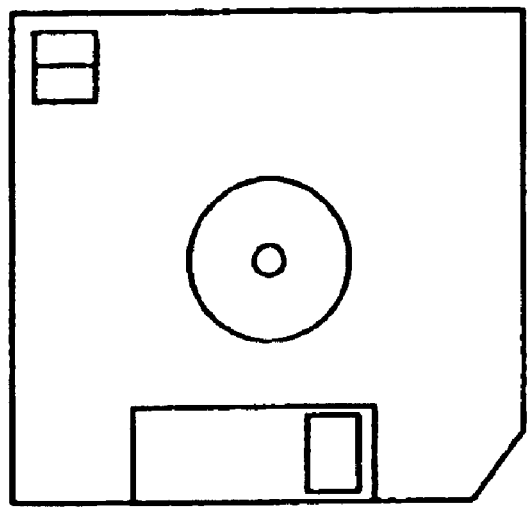
FIG. 10 shows a computer program product for storing executable program code that may be used in implementing the methods herein.

A preferred architecture for the implementations disclosed herein is now described, which may be used in either Internet or Intranet applications. FIG. 7 illustrates architecture for supporting two or three-tier web applications in the context of media streaming. This architecture supports the searching of a media (e.g., video) database by typing in keywords, and retrieving and playing back media clips selected by the user. The user begins with a standard "search" page 170 in Hyper-text markup language (HTML) presented by the client's browser (the Netscape Navigator® or e-Microsoft Internet Explorer® platforms may be used). The page 170 contains a POST form 175 for typing in keywords, which the user then submits by clicking on a "Submit" button. This results in an HTTP request 178 being sent to a web server 182, which in turn calls up an application server 186. The application server 186 performs the search, and generates the search results as an HTML page 190. The user then selects one or more of the media clips found by the search (each of which preferably has an associated time offset as discussed above in connection with FIG. 5), and the media browser allows the user to choose from a number of representations of a given media stream, such as those indicated in FIG. 3. The client can play a desired video clip at the appropriate time offset by communicating through a streaming video player plug-in 194 (such as Real Plugin or the IBM Video Charger Plugin, installed at the client side) to a streaming video server 198 (e.g., Real Server or the IBM Video Charger Server). Details regarding the IBM Video Charger Plugin and the IBM Video Charger Server may be found at http://www-4ibm.com/software/data/videocharger/. However, implementations of the invention may be used with a variety of media streaming formats, servers, browsers, and players. The graphical user interface (GUI) functionality used to support playback based on query results is thus extended to support the switching of views from a first media stream (e.g., skim video) to a second media stream (e.g., full length video), starting with the appropriate time offset given by the first media stream at the time of switching.

Although the video browsing content can be precomputed and streamed from the video server 198, video control logic (such as calculating time offsets and naming appropriate video source files) may be advantageously generated by a Common Gateway Interface (CGI) program and encapsulated in Dynamic HTML (DHTML) at the client side, as shown in the Appendix. As is known in the art, CGI is a standard for external gateway programs which permits them to interface with information servers such as HTTP servers. Various hardware and software arrangements for implementing these procedures may be used.

Various methods for calculating the starting points in a media stream are now described. In general, starting point calculations (offset calculations) may be performed on either the server side or the client side. In its simplest form, a mathematical function (e.g., a linear interpolation routine) may be employed to determine the starting point within a media stream. One starting point calculation algorithm which can be used in switching from a moving storyboard view to a full video view, as in implementations discussed herein, relies on a linear time correspondence calculation, i.e., the time in the second media stream is calculated by multiplying the time in the first stream by a constant, in which the constant is given by the relative speedup (compression) ratio between the two views. For example, if the compression ratio between a fast moving storyboard and its corresponding full video is 5, then 1 minute of viewing time in the fast moving storyboard corresponds (in the chronological sense) to 5 minutes of viewing time in the full video. In the case of nonlinear fast video playback, in which times depend on shot boundaries, the use of mathematical functions may be particularly advantageous in calculating the appropriate viewing time or frame number in a desired new view, as described in U.S. application Ser. No. 09/572136 to Amir et al. entitled "Fast video playback with automatic content-based variable speed" filed May 16, 2000 and by S. Srinivasan et al. in "What is in that video anyway: in search of better browsing" (6th IEEE International Conference on Multimedia Computing and Systems, Jun. 7–11, 1999, Florence, Italy).

One straightforward method of managing time offsets can be appreciated by considering the lookup or time correlation table shown in FIG. 8. For each video representation (skim video, fast moving storyboard, slow moving storyboard, and full video), each frame in that video representation is listed in the appropriate column using the SMPTE time format (Society of Motion Picture and Television, see http://www.smpte.org), in which hours, minutes, seconds, and frame number are presented as hh:mm:ss:ff. For each of the views, a frame represents approximately 1/30 second. The rows are arranged so that each entry in a row corresponds to the same point in chronological time, e.g., each of the 4 views within each row in FIG. 8 would show the same picture. The time correlation table may be computed from analyzing the corresponding media streams, or may be partially or manually entered into the server.

The various video representations are tied together, so that 60 seconds of viewing time within the slow moving storyboard view correspond to 15 seconds of viewing time within the fast moving storyboard view and 30 seconds of viewing time within the full video view. The fast moving storyboard view by its very nature is a condensed version of the full video, and consequently, the total number of frames within a fast moving'storyboard is less than the total number of frames of the corresponding full video. The opposite holds true for the slow moving storyboard. A skim video representation, on the other hand, reflects only segments of the full video, and hence, there are frames in the full video which do not correspond to frames in the skim video representation, as indicated by the dashes in FIG. 8. In FIG. 8, the skim video is seen to begin at a point corresponding to 5 seconds into the full video. The skim video continues for 5 seconds, and then picks up again at a point corresponding to 30 seconds into the full video.

If the user decides to move from the slow moving storyboard view to the full video view after viewing the slow moving storyboard for 10 seconds, the lookup table in FIG. 8 provides the corresponding total viewing time from the start of the full video required to bring the user to this point in the story (5 seconds). A time correlation table may also include information on other kinds of media streams such as the ones disclosed herein, e.g., audio and closed caption text.

As an alternative to the lookup table just described, each view (or more generally, each media stream) may be associated with its own table, such as those shown in FIG. 9, in which separate lookup tables are shown for the fast moving storyboard view and the full video view, respectively. Each cable has an index number in the left hand column, which is associated with the viewing time as given by the SMPTE format. The index numbers are chosen such that they allow the different representations to be correlated in a synchronized way, thereby providing a numerical link between different views. The indices thus allow one representation to be mapped into (correlated with) another representation. Within the full video view, n may simply be an integer multiple of the frame number up to that point, as in FIG. 9. In this example, 30 seconds of viewing time within the full video view (00:00:30:00), is given by the index 1800, which is seen to correspond to 15 seconds of viewing time within the fast moving storyboard view (00:00:15:00).

Devices such as a PDA or a cellular device might require a stream having different characteristics (e.g., the stream may have a different frame-rate, different duration, different audio speedup ratio), and so the offset calculation might be correspondingly different, depending on the particular device that is used by a user. Also, the methods described herein for calculating the time offsets between different media streams may be extended to the case in which several views are displayed on a computer screen simultaneously.

Implementations have been described for switching from a first media stream to a second media stream in which the viewing in the second media stream actually begins at a point which just precedes (in the chronological sense) the point at which the first media stream was exited. Such a method nevertheless entails a synchronization methodology in which the entry point in the second media stream is determined by and corresponds to (in the chronological sense) the exit point in the first media stream. This can be done by first computing the corresponding offset, and then decreasing this offset ("going back in time") by a fixed amount, e.g., three seconds, or by starting the playback of the second media stream at the beginning of the shot containing the computed offset point. The respective positions of the beginning of the shots may be precomputed and stored as a table, e.g., stored on the server.

The synchronization calculations themselves can be done at either the user (client) side or the provider (server) side. In either case, the timing details are handled in such a way that the user experiences a coherent story. For example, the video server 198 can keep a log of the different video streams available to the user and their corresponding lookup tables, thereby providing the user the ability to jump from a view in one video stream to the corresponding view in another video stream. Alternatively, lookup tables may be embedded in the data for the browser (e.g., in its web page). If an HTTP server is used, as in many of the preferred implementations described herein, the timing calculations may also be performed on the application server 186. Timing calculations may also be performed on a server other than the video server 198 or application server 186, e.g., on a intermediate or proxy server (not shown). It will be clear to those skilled in the art that time correlation tables and time computations require a small amount of storage and basic computation means, which can be implemented in various ways.

Further, synchronization data like that shown in FIG. 9 may be streamed with the media stream itself to facilitate the necessary calculations. In this case, it may be advantageous for the video server 198 to continually update the lookup table data as the video corresponding to the currently played media stream is viewed. This can be accomplished through the use of an additional data track dedicated to streaming lookup table data: such data may then be used in calculations related to one or more media streams, e.g., moving storyboard, audio, closed caption text, etc.

In a preferred implementation, the timing data which facilitates switching between two or more media streams can be represented and delivered as part of a standard for multimedia by adding the necessary data structures to the standard. For example, using SMIL 2.0, an author can describe the temporal behavior of a multimedia presentation, associate hyperlinks with media objects, and describe the layout of the presentation on a screen. The SMIL format would therefore be an appropriate placeholder for information about the time-relationships between two or more related media streams, such as tables and formulas. Similarly, the MPEG-7 standard under development permits content based indexing and access to multimedia streams. MPEG-7 might include timing data to support synchronized switching between related media streams. (For details on SMIL, see Synchronized Multimedia Integration Language (SMIL 2.0) Specification, W3C Working Draft Mar. 1, 2001 at http://www.w3.org/TR/smil20/)

In a preferred embodiment of the invention, there is provided media encoded with executable program code to effect any of the methods described herein. These media may include a magnetic or optical disk or diskette, for example. In preferred embodiments, this program code may be read by a digital processing apparatus such as a computer for performing any one or more of the methods disclosed herein.

APPENDIX

```
<HTML>
<HEAD>
<TITLE>IBM CueVideo Synchronized MultiMedia Browser</TITLE>
<meta name="SOURCE" value="IBM CueVideo">
<meta names="TITLE" value="IBM CueVideo Synchronized Media Browser">
<meta names="COPYRIGHT" value="Copyright (c) 2000 by IBM Corporation. All Rights Reserved.">
</HEAD>
<SCRIPT LANGUAGE="JavaScript">
PLAYER_SYNCHTIME=10;
NumOfHits=2;
CurntHit=1;
FVStartTimes=new Array(2);
BaseNames=new Array(2);
TiticNames=new Array(2);
MatchsNames=new Array(2);
ViewSuffix=new Array(5);
myTimer=null;
CurntPos=0;
CurntRate=1.0;
CurntSource=null;
CurntOrigLength=0;
CurntMode=1;
can_play=false;
RealRoot='http://cvideo.almaden.ibm.com:8080/ramgen/cuelearn/';
HttpRoot='http://cvideo.almaden.ibm.com/cuelearn/';
bn=' ';
function InitVars ( ) }
ViewSuffix[0]=" ";
ViewSuffix[1]=" ";
ViewSuffix[2]="-msh";
ViewSuffix[3]="-msh_0.666";
ViewSuffix[4]"-msb_1.25";
BaseNames[0]='coffee';
TitleNames[0]='<U>coffee</U> [00:07:37]';
MatchsNames[0]='Matched words:
<U><B>warm</B></U>    Score:<U>100.00</U>';
FVStartTimes[0]=457000.0;
BaseNames[1]='coffee';
TitleNames[1]='<U>coffee </U> [00:05:43]';
MatchsNames[1]='Matched words:
<U>warm</U>    Score:<U>69.44</U>';
FVStartTimes[1]=343000.0;
}
function CheckPlugin( ) {
var mimetype='audio/x-pn-realaudio-plugin';
if (navigator.appName=='Netscape') {
if (navigator.mimeTypes[mimetype]!=null) {
if (navigator.mimeTypes[mimetype].enabledPlugin !=null)
{
can_play=true;
}
}
}
else
{
if (document.embeds) can_play=true;
}
}
function PositionControls( ) {
CheckPlugin( );
if (!can_play)
{
alert(To use this web site please install the free RealPlayer 7 Basic plug-in.');
window.location='/the_plugin_version_update_page.html';
}
else
{
InitVars( );
PositionTitle( );
PositionViews( );
var foo=document.Video.GetVersionInfo( );
var foobar=parseFloat(foo);
if (foobar<6) {
alert(To use this web site please upgrade your plug-in to the free RealPlayer 7.');
window.location='/the_plugin_version_update_page.html';
}VideoName=
RealRoot+BaseNames[CurntHit-1]+'_course/video/'+BaseNames[CurntHit-1]+ViewSuffix[Curn tMode]+'.smil';
PlayFullVideo(VideoName, FVStartTimes[CurntHit-1] *CurntRate);
}
function RepositionControls( ) {
PositionTitle( );
PositionViews( );
VideoName=
RealRool+BaseNames[CurntHit-1]+'_course/video/'+BaseNames[CurntHit-1]+ViewSuffix[Curn tModel+'.smil';
PlayFullVidea(VideoName, FVStartTimes[CurntHit-1] *CurntRate);
{
function PositionTitle( ) }
Title='';
Title+='Query:                        <U>warm</U>    ';
Title+='Result'+CurntHit.toString( )+'/'+NumOfHits.toString( )+': ';
Title+=TitleNames[CurntHit-1]+'<BR>';
Title+=MatchsNames[CurntHit-1];
var output=
'<table width="640" border="0" cellspacing="5" cellpadding="2">'+
```

```
'<tr>'+
'<td><img src="/images/cvideo_banner.gif" alt="IBM
    CueVideo" border="0"></td>'+
'</tr>'+
'<tr bgcolor="21249C">'+
'<td> <font color="#FFFFFF" face"Helvetica,
    HELV, sans-serif">'+Title+'</font></td>'+
'</tr>'+
'/table>';
if (document.all)
    document.all('TitleArea').innerHTML=output;
else if (document.layers) {
document.layers['TitleArea'].top=5;
document.layers['TitleArea'].left=5;
document.layers['TitleArea'].width=800;
document.layers['TitleArea'].height=200;
document.layers['TitleArea'].dacument.open( );
document.layers['TitleArea'].document.writeIn(output);
document.layers['TitleArea'].document.close( );
}
}
function PositionViews( ) {
bn=BaseNames[CurntHit-1];
MSSName=RealRoot+bn+'_course/video/'+bn+'-
    msb.smil';
FMSBName=RealRoot+bn+'_course/video/'+bn+'-msb_
    0.666.smil';
SMSBName=RealRoot+bn+'_course/video/'+bn+'-msb_
    1.25.smil';
ANMName=RealRoot+bn+'_course/video/'+bn+
    'fixed.smil';
SB2DName=HttpRoot+bn+'_course/images/'+bn+'-
    sb0001.html';
VideoName=RealRoot+bn+'_course/vidoe/'+bn+'.smil';
var output='<BR><FORM METHOD=POST>'+
'<TABLE  NOBORDER  CELLSPACING=5
    CELLPADDING=5 WIDTH="640" >'+
'<TR><TD ALIGN=center>'+
'<INPUT TYPE="button" Value="Storyboard (SB)"
    onClick="location.href=\"+SB2DName+'\"">'+
'<INPUT TYPE="button" Value="Moving SB"
    onClick="JumpToVideo( \"+MSBName+'\',2,1.0)">'+
'<INPUT TYPE="button" Value="Fast SB"
    onClick="JumpToVideo( \"+FMSBName+'\',3,0.666)">'+
'<INPUT TYPE="button" Value="Slow SB"
    onClick="JumpToVideo( \"+SMSBName+'\',4,1.25)">'+
'<INPUT TYPE="button" Value="FullVideo"
    onClick="JumpToVideo( \"+VideoName+'\',1,1.0)">';
output=output+'</TD></TR>';
if (NumOfHits>1)
{
output=output +
'<TR><TD ALIGN=center>'+
'<FONT COLOR=WHITB>'+
CurntHit.toString( )+' of '+NumOfHits.toString( )+' '+
'<INPUT TYPE="BUTTON" VALUE="Prev Result"
    onClick="ViewPrev( )";>'+
'<INPUT TYPE="BUTTON" VALUE="Next Result"
    onClick="ViewNext( )";></TD></TR>';
}
else
{
output=output +
'<TR><TD ALIGN=right>'+
'<FONT COLOR=BLACK>'+'A'+'</font>'+
'</TD></TR>';
}
output=output+'</table>';
if (document.all)
document.all('ViewsTable').innerHTML=output;
else if (document.layers) {
document.layers['ViewsTable'].top=350;
document.layers['ViewsTable'].left=10;
document.layers['ViewsTable'].width=600;
document.layers['ViewsTable'].height=200;
document.layers['ViewsTable'].zIndex=40;
document.layers['ViewsTable'].document.open( );
document.layers['ViewsTable'].document.writeln(output);
document.layers['ViewsTable'].document.close( );
}
}
function PlayFullVideo(s,i) }
    if (s!=CurntSource) }
        if (CurntSource!=null)
            document.Video.DoStop( );
        document.Video.SetSource(s);
    CurntSoure=s;
}
else if (CurntOrigLength>0) {
    ThisLength=document.Video.GetLength( );
    i=i*ThisLength/CurntOrigLength;
}
CurntPos=i;
if (document.Video.GetPlayState( ) !=3) {
document.Video.SetVolume(100);
document.Video.DoPlay( );
if (CurntPos>1000)
myTimer=setTimeout('WaitForFirstPlay( )',PLAYER_
    SYNCHTIME);}
else {
if (CurntPos>0) {
document.Video.DoPause( );
document.Video.SetPosition(CurntPos);
document.Video.SetVolume(100);
document.Video.DoPlay( );
}
}
}
function WaitForFirstPlay ( ) {
clearTimeout(myTimer);
if (documenl.Video.GetPlayState( ) !=3)
myTimer=setTimeout('WaitForFirstPlay( )',PLAYER_
    SYNCHTIME);
else
{
document.Video.DoPause( );
if (CurntMode=1)
    CurntOrigLength=document.Video.GetLength( );
document.Video.SetPosition(CurntPos);
document.Video.DoPlay( );
}
}
function WaitForPlay ( ) {
clearTimeout(myTimer);
if (document.Video.GetPlayState( ) !=3)
myTimer=setTimeout('WaitForPlay( )',PLAYER_
    SYNCHTIME);
else
{
dacument.Video.DoPause( ),
theoffset=CurntPos*CurntRate;
document.Video.SetPosition(theoffset);
documem.Video.DoPlay( );
}
}
```

```
function JumpToVideo(newvideo,newMode,newRate) {
CurntPos=document.Video.GetPosition( )/CurntRate;
document.Video.DoStop( );
document.Video.SetSource(newvideo);
CurntMode=newMode;
CurntRate=newRate;
document.Video.DoPlay( );
if (CurntPos>1000)
myTimer=setTimeout('WaitForPlay( )',PLAYER_
    SYNCHTIME);
}
function ViewNext( ) {
if (CurntHit<NumOfHits)
CurntHit=CurntHit+1;
else
CurntHit=1;
//update StartSB time
RepositionControls( );
}
function ViewPrev( ) }
if (CurntHit>1)
CurntHit=CurntHit−1;
else
CurntHit=NumOfHits;
//update StartSB time
RepositionControls( );
}
</SCRIPT>
<BODY TEXT="#000000" LINK="#3333FF" VLINK=
    "#3366FF" ALINK="#FFFF00">
<BODY becolor="#000000">
<BODY onLoad=PositionControls( )>
<BR>
<SPAN ID="TitleArea"
STYLE=
    "top:5;left:5;height:200;width:800;position:absolute"></
    SPAN>
<SPAN ID="ViewsTable"
STYLE=
    "top:370;left:5;width:600;height:200;position:absolute"
    ></SPAN>
<BR><BR><BR><BR><BR><BR>
<table borderer=0 cellpadding="0" cellspacing="0"
    bgcolor="000000" width="640">
<tr>
<td alig=center>
<EMBED   NAME=Video   SRC="http://
    cvideo.almaden.ibm.com:8080/ramgen/cuelearn/
    ?embed"
WIDTH=600 HEIGHT=200
CONTROLS=1mageWindow   CENTER=true
    CONSOLE=_master><BR>
</td>
</tr>
<tr>
<td align=center>
<EMBED SRC="http://cvideo.almaden.ibm.com:8080/
    ramgen/cuelearn/?embed" WIDTH=40
HEIGHT=20 CONTROLS=PlayButton CONSOLE=_
    master>
<EMBED SRC="http://cvideo.almaden.ibm.com:8080/
    ramgen/cuelearn/?embed" WIDTH=300
HEIGHT=20 CONTROLS=PositionSlider CONSOLE=_
    master>
<EMBED SRC="http://cvideo.almaden.ibm.com:8080/
    ramgen/cuelearn/?embed" WIDTH=100
HEIGHT=20 CONTROLS=PositionField CONSOLE=_
    master><BR>
</td>
</tr>
</table>
</dBODY>
</HTML>
```

What is claimed is:

1. A method of browsing, comprising:
accessing a first media stream;
allowing the first media stream to play up to some point in the first media stream; and
switching media streams by selecting a second media stream different from the first media stream, said selecting thereby starting the second media stream at a point corresponding to said point in the first media stream, wherein content in the first media stream is time compressed with respect to content in the second media stream, to reduce the time a user spends searching for media content of interest to the user.

2. The method of claim 1, wherein the second media stream has media content in common with the first media stream.

3. The method of claim 1, wherein the second media stream includes a full video.

4. The method of claim 1, wherein one of the media streams includes audio.

5. The method of claim 1, wherein one of the media streams includes closed caption text.

6. The method of claim 1, wherein one of the media streams is selected from the group consisting of skim video, moving storyboard, full video, audio, text, animation, and graphics.

7. The method of claim 1, said switching comprising clicking on a mouse or depressing a key on a keyboard.

8. The method of claim 1, wherein said point in the second media stream is selected from one of a plurality of points in the second media stream corresponding to the first media stream.

9. The method of claim 1, wherein said point in the second media stream corresponds in the chronological sense to said point in the first media stream.

10. The method of claim 9, wherein the first media stream includes a skim video and the second media stream includes a full video.

11. The method of claim 9, wherein one of the media streams is dedicated to audio.

12. The method of claim 9, wherein one of the media streams is sped-up audio.

13. The method of claim 9, wherein one of the media streams includes text.

14. The method of claim 9, wherein one of the media streams is dedicated to closed caption text.

15. The method of claim 9, wherein one of the media streams includes moving storyboard with fast or slow audio.

16. The method of claim 9, wherein one of the media streams includes both audio and video.

17. The method of claim 9, wherein one of the media streams includes video, and the rate at which the video is streamed out is controlled by a user.

18. The method of claim 9, wherein one of the media streams includes a low bandwidth video stream.

19. The method of claim 9, wherein said starting point in the second media steam is determined by accessing a look-up table.

20. The method of claim 9, wherein said starting point in the second media stream is determined from a mathematical formula.

21. The method of claim 9, wherein said starting point in the second media stream is computed from data that are streamed with the first media stream.

22. The method of claim 9, wherein said starting point in the second media stream compensates for user response time and thus is not precisely synchronized with said point in the first media stream.

23. The method of claim 9, wherein any synchronization mismatch between said first and second points is less than about 3 seconds of viewing time.

24. The method of claim 9, wherein said starting point in the second media stream corresponds to the beginning of a shot or a video scene.

25. The method of claim 9, wherein said starting point in the second media stream corresponds to the beginning of a sentence.

26. The method of claim 9, wherein one of the media streams includes more than one track.

27. The method of claim 1, further comprising searching the first media stream for media content of interest to the user.

28. The method of claim 1, wherein the first media stream includes at least one of moving storyboard and skim video.

29. A method of providing media streams to a browser user, comprising:
 providing a first media stream;
 receiving a request from the user to access a second media stream different from the first media stream, the request being generated at a point in the first media stream; and
 providing as a result of said request, the second media stream starting at a point corresponding to said point in the first media stream, wherein content in the first media stream is time compressed with respect to content in the second media stream, to reduce the time the user spends searching for media content of interest to the user.

30. The method of claim 29, wherein the second media stream has media content in common with the first media stream.

31. The method of claim 29, wherein the second media stream includes a full video.

32. The method of claim 29, wherein one of the media streams includes audio.

33. The method of claim 29, wherein one of the media streams includes closed caption text.

34. The method of claim 29, wherein said point in the second media stream corresponds in the chronological sense to said point in the first media stream.

35. The method of claim 29, wherein the first media stream includes a skim video and the second media stream includes a full video.

36. The method of claim 34, wherein one of the media streams is dedicated to audio.

37. The method of claim 34, wherein one of the media streams includes text.

38. The method of claim 34, wherein one of the media streams includes both audio and video.

39. The method of claim 34, wherein said starting point in the second media stream compensates for user response time and thus is not precisely synchronized with said point in the first media stream.

40. The method of claim 34, wherein any mismatch between said first and second points is less than about 3 seconds of viewing time.

41. The method of claim 34, wherein said starting point in the second media stream corresponds to the beginning of a shot or a video scene.

42. The method of claim 34, wherein said starting point in the second media stream corresponds to the beginning of a sentence.

43. The method of claim 29, wherein said point in the second media stream is selected from one of a plurality of points in the second media stream corresponding to the first media stream.

44. The method of claim 29, wherein the second media stream is provided to the user after the user searches the first media stream for media content of interest to the user.

45. The method of claim 29, wherein the first media stream includes at least one of moving storyboard and skim video.

46. A computer program product comprising a computer readable medium having computer-executable program instructions thereon, comprising:
 program instructions enabling a browser to access a first media stream; and
 program instructions enabling the browser to switch media streams in response to a browser user selecting a second media stream different from the first media stream, after the user has allowed the first media stream to play up to some point in the first media stream, said selecting thereby starting the second media stream at a point corresponding to said point in the first media stream, wherein content in the first media stream is time compressed with respect to content in the second media stream, to reduce the time the user spends searching for media content of interest to the user.

47. The computer program product of claim 46, wherein said point in the second media stream corresponds in the chronological sense to said point in the first media stream.

48. A computer program product comprising a computer readable medium having computer-executable program instructions thereon, comprising:
 program instructions for providing a first media stream to a browser user;
 program instructions for receiving a request from the user to access a second media stream different from the first media stream, the request being generated at a point in the first media stream; and
 program instructions for providing to the browser user, as a result of said request, the second media stream starting at a point corresponding to said point in the first media stream, wherein content in the first media stream is time compressed with respect to content in the second media stream, to reduce the time the user spends searching for media content of interest to the user.

49. The computer program product of claim 48, wherein said point in the second media stream corresponds in the chronological sense to said point in the first media stream.

50. A method of browsing, comprising:
 accessing a first media stream;
 allowing the first media stream to play up to some point in the first media stream; and
 switching media streams by selecting a second media stream different from the first media stream, said selecting thereby starting the second media stream at a point corresponding in the chronological sense to said point in the first media stream, wherein said starting point in the second media stream compensates for user response time and thus is not precisely synchronized with said point in the first media stream.

51. The method of claim 50, wherein the second media stream has media content in common with the first media stream.

52. The method of claim 50, wherein the second media stream includes a full video.

53. The method of claim 50, wherein one of the media streams is selected from the group consisting of skim video, moving storyboard, full video, audio, text, animation, and graphics.

54. The method of claim 50, said switching comprising clicking on a mouse or depressing a key on a keyboard.

55. The method of claim 50, wherein the first media stream includes a skim video and the second media stream includes a full video.

56. The method of claim 50, wherein one of the media streams includes moving storyboard with first or slow audio.

57. The method of claim 50, wherein one of the media streams includes video, and the rate at which the video is streamed out is controlled by a user.

58. The method of claim 50, wherein one of the media streams includes a low bandwidth video stream.

59. The method of claim 50, wherein said starting point in the second media stream is determined by accessing a look-up table.

60. The method of claim 50, wherein said starting point in the second media stream is determined from a mathematical formula.

61. The method of claim 50, wherein said starting point in the second media stream is computed from data that are streamed with the first media stream.

62. The method of claim 50, wherein any synchronization mismatch between said first and second points is less than about 3 seconds of viewing time.

63. The method of claim 50, wherein said starting point in the second media stream corresponds to the beginning of a shot or a video scene.

64. The method of claim 50, wherein said starting point in the second media stream corresponds to the beginning of a sentence.

65. The method of claim 50, wherein one of the media streams includes more than one track.

66. A method of providing media streams to a browser user, comprising providing a first media stream;

retrieving a request from the user to access a second media stream different from the first media stream, the request being generated at a point in the first media stream; and providing, as a result of said request, the second media stream starting at a point corresponding in the chronological sense to said point in the first media stream, wherein said starting point in the second media stream compensates for user response time and thus is not precisely synchronized with said point in the first media stream.

67. The method of claim 66, wherein the second media stream has media content in common with the first media stream.

68. The method of claim 66, wherein the second media stream includes a full video.

69. The method of claim 66, wherein the first media stream includes a skim video and the second media stream includes a full video.

70. The method of claim 66, wherein any mismatch between said first and second points is less than about 3 seconds of viewing time.

71. The method of claim 66, wherein said starting point in the second media stream corresponds to the beginning of a shot or a video scene.

72. The method of claim 66, wherein said starting point in the second media stream corresponds to the beginning of a sentence.

73. A computer program product comprising a computer readable medium having computer-executable program instructions thereon, comprising:

program instructions enabling a browser to access a first media stream; and program instructions enabling the browser to switch media streams in response to a browser user selecting a second media stream different from the first media stream, after the user has allowed the first media stream to play up to some point in the first media stream, said selecting thereby starting the second media stream at a point corresponding in the chronological sense to said point in the first media stream, wherein said starting point in the second media stream compensates for user response time and thus is not precisely synchronized with said point in the first media stream.

74. A computer program product comprising a computer readable medium having computer-executable program instructions thereon, comprising:

program instructions for providing a first media stream to a browser user;

program instructions for receiving a request from the user to access a second media stream different from the first media stream, the request being generated at a point in the first media stream; and program instructions for providing to the browser user, as a result of said request, the second media stream starting at a point corresponding in the chronological sense to said point in the first media stream, wherein said starting point in the second media stream compensates for user response time and thus is not precisely synchronized with said point in the first media stream.

* * * * *

UNITED STATES PATENT AND TRADEMARK OFFICE
CERTIFICATE OF CORRECTION

PATENT NO. : 6,907,570 B2 Page 1 of 1
APPLICATION NO. : 09/822035
DATED : June 14, 2005
INVENTOR(S) : Arnon Amir, Dulce B. Ponceleon and Savitha Srinivasan It is certified that error appears in the above-identified patent and that said Letters Patent is hereby corrected as shown below:

In Column 19, line 43, Claim 35, delete "29" and replace it with --34--.

Signed and Sealed this

Twentieth Day of November, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,907,570 B2 | Page 1 of 1 |
| APPLICATION NO. | : 09/822035 | |
| DATED | : June 14, 2005 | |
| INVENTOR(S) | : Arnon Amir, Dulce B. Ponceleon and Savitha Srinivasan | |

It is certified that error appears in the above-identified patent and that said Letters Patent is hereby corrected as shown below:

In Column 19, line 46, Claim 35, delete "29" and replace it with --34--.

This certificate supersedes the Certificate of Correction issued November 20, 2007.

Signed and Sealed this

Third Day of June, 2008

JON W. DUDAS
*Director of the United States Patent and Trademark Office*